United States Patent [19]

Hagihara

[11] Patent Number: 5,426,598
[45] Date of Patent: Jun. 20, 1995

[54] ADDER AND MULTIPLIER CIRCUIT EMPLOYING THE SAME

[75] Inventor: Yasuhiko Hagihara, Tokyo, Japan

[73] Assignee: NEC Corporation, Tokyo, Japan

[21] Appl. No.: 199,655

[22] Filed: Feb. 22, 1994

[30] Foreign Application Priority Data

Feb. 22, 1993 [JP] Japan .................................. 5-031042

[51] Int. Cl.$^6$ ............................................. G06F 7/52
[52] U.S. Cl. .................................... 364/759; 364/786
[58] Field of Search ............... 364/786, 758, 759, 784, 364/757

[56] References Cited

U.S. PATENT DOCUMENTS

| | | | |
|---|---|---|---|
| 4,901,270 | 2/1990 | Galbi et al. | 364/786 |
| 5,210,711 | 5/1993 | Rossmere et al. | 364/786 |
| 5,303,176 | 4/1994 | Hrusecky et al. | 364/759 |

OTHER PUBLICATIONS

Lai et al., "Logic Network of Carry-Save Adders", IEEE Trans. on Computer, vol. C-31, No. 9, Sep. 1982, pp. 870-882.

Singh et al., "Multiple Operand Addition and Multiplication", IEEE Trans. on Computer, vol. C-22, No. 2, Feb. 1973, pp. 113-120.

Shen et al., "4-2 Carry-Save Adder Implementation Using Send Circuits", IBM Tech. Disclosure Bull. vol. 20, No. 9 Feb. 1978, pp. 3594-3597.

Weinberger, "4-2 Carry-Save Adder Module", IBM Tech. Disclosure Bull. vol. 23, No. 8, Jan. 1981, pp. 3811-3814.

*Primary Examiner*—Tan V. Mai
*Attorney, Agent, or Firm*—Foley & Lardner

[57] ABSTRACT

A multiplier circuit has a partial AND generating portion generating n in number of partial AND's as products of a multiplied value and respective bits of n-bit multiplying value, an intermediate sum generating portion inputting n in number of partial AND's, generating intermediate sums and reducing number of the intermediate sums progressively for finally outputting two intermediate sums, and an adder adding two intermediate sums output from the intermediate sum generating portions for outputting a product of multiplication of the multiplied value and the multiplying value. The intermediate sum generating portion has a plurality of intermediate sum calculating circuits, each of which has a plurality of adders of the type of four inputs and two outputs, connected in parallel, the intermediate sum calculating circuits are connected in a plurality of stages in a tree-like configuration.

7 Claims, 3 Drawing Sheets

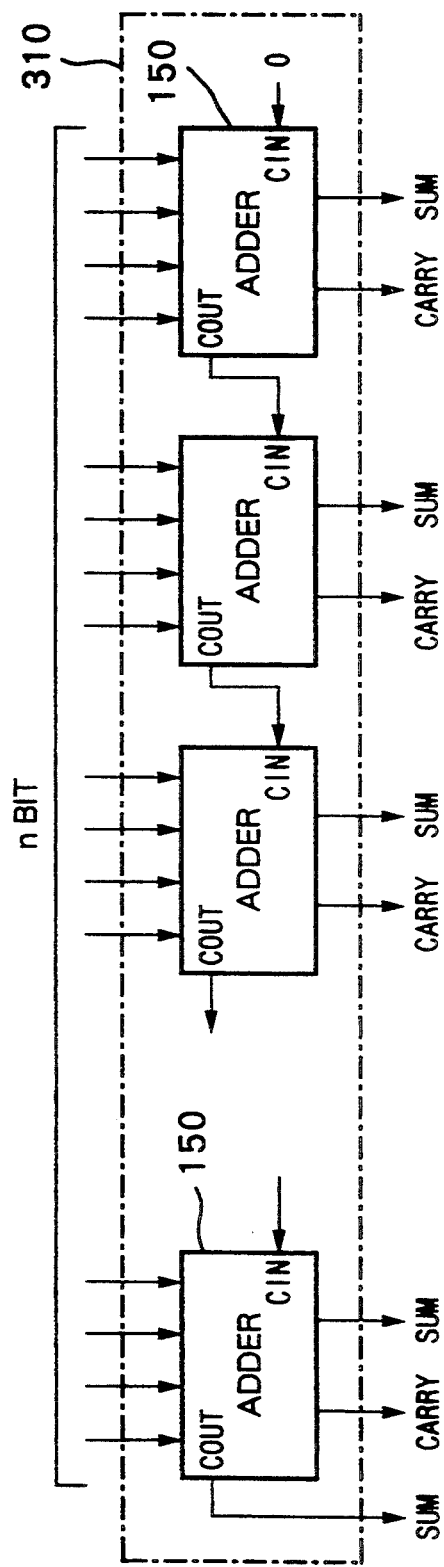

ADDER AND MULTIPLIER CIRCUIT EMPLOYING THE SAME

BACKGROUND OF THE INVENTION

1. Field of the Invention

The present invention relates generally to an adder and a multiplier circuit employing the same. More specifically, the invention relates to an adder which generates an intermediate sum of the multiplier circuit.

2. Description of the Related Art

Conventionally, a binary multiplier circuit multiplying n-bit binary values, formed with an integrated circuit, calculates logical multiplies (AND's) of respective bits of a multiplied value and multiplying value to generate n in number of n-bit partial AND's (intermediate sums), and then calculates a ground sum of the partial AND's to derive a product. As a process for deriving the ground sum, a series of full adders, in which adders of three inputs and two outputs are connected in parallel, are employed to reduce the number of the partial AND's into $\frac{2}{3}$ at respective stages. Therefore, the number of the partial AND's is reduced in order of n→$\frac{2}{3}$n→4/9 n . . . through a plurality of stages. When the number of the partial AND's is reduced up to two, the ground sum is calculated by means of a normal adder having two inputs and one output. The multiplier circuit employing the process set forth above has been referred to as Wallace type multiplier circuit. Here, the adder with three inputs and two outputs is a circuit to perform operation to output two outputs C, S satisfying the equation $2C+S=X+Y+Z$ with respect to given three inputs X, Y and Z.

The conventional Wallace type multiplier circuit for multiplying two n-bit values comprises a partial AND's generating portion, an intermediate sum generating portion, in which a plurality stages of full adder series formed by connecting full adders in parallel are provided in a tree-like configuration, and the adder of two inputs and one output.

At first, by the partial AND's generating portion n in number of n-bit partial AND's, $X \times Y1$, $X \times Y2$, $X \times Y3$, . . . $X \times Yn$ are calculated from a multiplied value X and multiplying value Y (Y1, Y2, Y3, . . . Yn).

Then, at the first stage of the full adder series, respective three partial AND's are input to respectively corresponding full adders. Each individual full adder receiving three input of the partial AND's outputs two intermediate sum. Therefore, through the first stage of the full adder series, the intermediate sums of two-third in number of the initial number of the partial AND's are output. In the similar manner, a number of the intermediate sums output from the first stage full adder series is reduced by two-third through the second stage full adder series. The number of stages of the intermediate sum calculating circuits can be expressed by x satisfying the equation $(\frac{2}{3})^x \cdot n = 2$, and, in turn, expressed by (log n−log 2)/(log 1.5). Therefore, by (log n−log 2)/(log 1.5) in number of stages of full adder series, the number of the intermediate sums is reduced up to two. Finally, remaining two intermediate sums are input to the adder of two inputs and one output to derive the product.

The Wallace type multiplier circuit set forth above is also referred to as a carry-save adder tree.

In the intermediate sum generating process in the above-mentioned conventional multiplier circuit, the full adders of three inputs and two outputs are employed. It requires a large number of stages of the full adder series to reduce the number of the intermediate sums into two to take a long period in operation. The period required for reducing the number of the intermediate sums into two is the significant part of the overall period required for arithmetic operation including generation of the partial AND's, reduction of number of the partial AND's into two intermediate sums and adding the finally obtained two intermediate sums. Therefore, the process to reduce the number of the intermediate sums into two is a substantial barrier in speeding up of the multiplier circuit.

SUMMARY OF THE INVENTION

Therefore, it is an object of the present invention to provide a multiplier circuit which can shorten a period required for reducing intermediate sums into two and thus permits realization of a speeding up of multiplying operation by resolving a constraint in shortening of the arithmetic operation period.

Another object of the present invention is to provide an adder to be employed in the above-mentioned multiplier circuit, which adder can perform multiplying operation in four inputs and two outputs and thus can contribute shortening of the arithmetic operation period.

In order to accomplish the above-mentioned and other objects, an adder, according to one aspect of the present invention, comprises:

first logic circuit receiving first to fourth inputs and outputting a first logical value as an AND of the first and second inputs and a second logical value as an AND of the third and fourth inputs as first output values;

second logic circuit outputting a third logical value as an OR of the first logical value and an inverted value of an OR of the first and second inputs;

third logic circuit outputting a fourth logical value as an OR of the second logical value and an inverted value of an OR of the third and fourth inputs;

fourth logic circuit outputting a fifth logical value as an exclusive OR of the third and fourth logical values;

fifth logical circuit outputting an exclusive OR of the fifth logical value and a fifth input as a second output value; and sixth logical circuit performing OR operation for an AND of the first and second logical values, an AND of the third and fourth logical values and an AND of the fifth input and the fifth logical value to output a third output.

According to another aspect of the invention, a multiplier circuit comprises:

partial AND generating means for generating n in number of partial AND's as products of a multiplied value and respective bits of n-bit multiplying value;

intermediate sum generating means for inputting n in number of partial AND's, generating intermediate sums and reducing number of the intermediate sums progressively for finally outputting two intermediate sums;

adder means for adding two intermediate sums output from the intermediate sum generating means for outputting a product of multiplication of the multiplied value and the multiplying value;

the intermediate sum generating means comprising a plurality of intermediate sum calculating circuits, each of which comprises a plurality of adders of the type of four inputs and two outputs, connected in parallel, the intermediate sum calculating circuits are connected in a plurality of stages in a tree-like configuration; and the adder comprising first logic circuit receiving first to fourth inputs and outputting a first logical value as an AND of the first and second inputs and a second logical value as an AND of the third and fourth inputs as first output values;

second logic circuit outputting a third logical value as an OR of the first logical value and an inverted value of an OR of the first and second inputs;

third logic circuit outputting a fourth logical value as an OR of the second logical value and an inverted value of an OR of the third and fourth inputs;

fourth logic circuit outputting a fifth logical value as an exclusive OR of the third and fourth logical values;

fifth logical circuit outputting an exclusive OR of the fifth logical value and a fifth input as a second output value; and sixth logical circuit performing OR operation for an AND of the first and second logical values, an AND of the third and fourth logical values and an AND of the fifth input and the fifth logical value to output a third output.

In the preferred construction, the intermediate sum calculating circuit is constructed by establishing parallel connection of a plurality of adders by connecting first output of the adder to the fifth input of the adder at the next digit. Also, the intermediate sum calculating circuit inputs "0" to the fifth input of an adder at the lowermost digit and takes the third output as the second output in the adder at the uppermost digit.

In practice, the intermediate sum generating means includes the intermediate sum calculating circuits of (log n−log 2)/(log 2) stages.

In the preferred construction, the first logic circuit comprises a first NAND gate inputting the first and second inputs and outputting a first NAND output;

a second NAND gate inputting the third and fourth inputs and outputting a second NAND output; and a third NAND gate inputting the first and second NAND outputs and outputting an intermediate carry as the first output;

the second logic circuit comprises a first OR gate inputting the first and second inputs and outputting a first OR output; and a fourth NAND gate inputting the first NAND output and the first OR output and outputting a fourth NAND output;

the third logic circuit comprises:

a second OR gate inputting the third and fourth inputs and outputting a second OR output; and a fifth NAND gate inputting the second NAND output and the second OR output and outputting a fifth NAND output;

the fourth logic circuit comprises:

a first exclusive OR gate inputting the fourth and fifth NAND outputs and outputting a first exclusive OR output;

the fifth logic circuit comprises:

a second exclusive OR gate inputting the fifth input and the first exclusive OR output and outputting a second exclusive OR output as a sum of the first to fourth inputs;

the sixth logic circuit comprises:

first NOR gate inputting the first and second NAND outputs and outputting a first NOR output;

a second NOR gate inputting the fourth and fifth NAND outputs and outputting a second NOR output;

an AND gate inputting the fifth input and the first exclusive OR output and outputting an AND output;

a third NOR gate inputting the first and second NOR outputs and the AND outputs and outputting a third NOR output; and an inverter outputting a carry as the third output by inverting the third NOR output.

BRIEF DESCRIPTION OF THE DRAWINGS

The present invention will be understood more fully from the detailed description given hereinbelow and from the accompanying drawings of the preferred embodiment of the invention, which, however, should not be taken to be limitative to the invention, but are for explanation and understanding only.

In the drawings:

FIG. 3 is a block diagram showing a construction of an intermediate sum generating circuit in the multiplier circuit of FIG. 2.

DESCRIPTION OF THE PREFERRED EMBODIMENT

Figure 1:
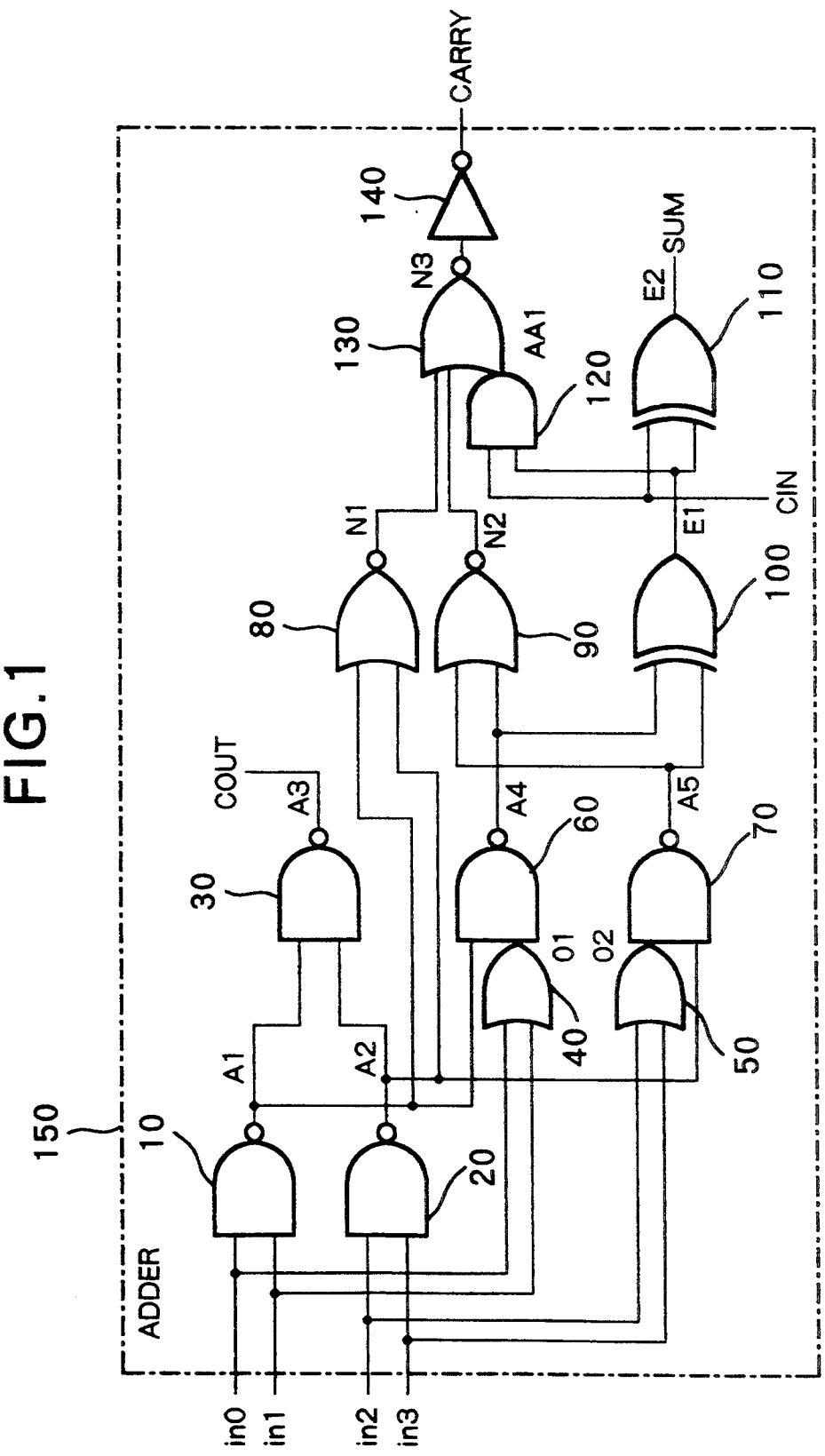
FIG. 1 is a block diagram showing a construction of the preferred embodiment of an adder of four inputs and two outputs according to the present invention.

The preferred embodiment of the present invention will be discussed hereinafter with reference to the accompanying drawings. FIG. 1 shows a construction of the preferred embodiment of an adder to be employed in an intermediate sum generating circuit of the preferred embodiment of a multiplier circuit according to the present invention.

In FIG. 1, the preferred embodiment of an adder 150 of four inputs and two outputs has a NAND gate 10 receiving a first input in0 and a second input in1 and outputting an output A1, a NAND gate 20 receiving a third input in2 and a fourth input in4 and outputting an output A2, a NAND gate 30 inputting the outputs A1 and A2 and outputting an output A3 (an intermediate carry cout), an OR gate 40 receiving the first and second inputs in0 and in1 and outputting O1, an OR gate 50 receiving the third and fourth inputs in2 and in3 and outputting an output O2, a NAND gate 60 inputting the output A1 and the output O1 and outputting an output A4, a NAND gate 70 receiving the output A2 and the output O2 and outputting an output A5, a NOR gate 80 inputting the outputs A1 and A5 and outputting an output N1, a NOR gate 90 inputting the outputs A2 and A5 and outputting N2, an exclusive OR gate 100 inputting the outputs A4 and A5 and outputting an output E1, an exclusive OR gate 110 inputting a carry input cin and the output E1 and outputting a sum output SUM, an AND gate 120 inputting the input cin and the output E1 and outputting an output AA1, a NOR gate inputting the outputs N1 and N2 and the output AA1 and outputting an output N3, and an inverter 140 receiving the output N3 and outputting a carry output CARRY.

In the preferred construction, the OR gate 40 and the NAND gate 60, the OR gate 50 and the NAND gate 70, and the AND gate 120 and the NOR gate 130 are respectively formed by CMOS composite gates.

The adder of four inputs and two outputs is a circuit for deriving C (carry) and S (sum) satisfying the equation $X+Y+Z+W=2C+S$ when the first to fourth inputs X, Y, Z, W are input. It should be noted "2" of "2C" is a weighting value.

Figure 2:
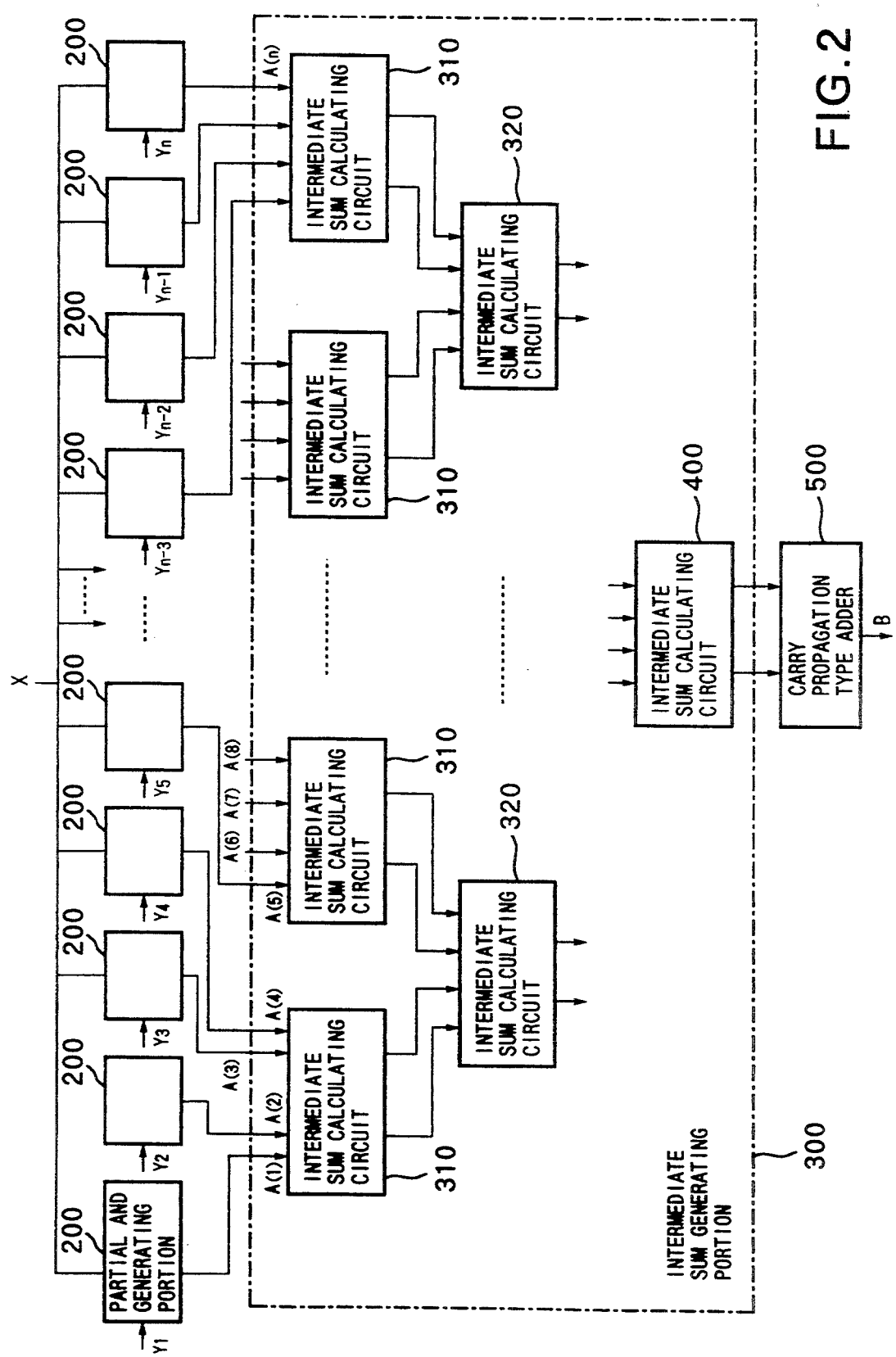
FIG. 2 is a block diagram showing a construction of the preferred embodiment of a multiplier circuit according to the present invention.

Next, the preferred embodiment of a multiplier circuit constructed employing the preferred embodiment of the adder set forth above, will be discussed with reference to FIG. 2.

The preferred embodiment of the multiplier circuit which is designed to perform multiplication of n-bit multiplied value and a multiplying value, has n in number of partial AND's generating portion 200, an intermediate sum generating portion 300 inputting n of partial AND's and finally generates two intermediate sums, and a carry propagation type adder 500 of two inputs for adding two intermediate sums output from the intermediate sum generating portion 300.

The intermediate sum generating portion 300 is constructed by connecting a first stage intermediate sum calculating circuits 310 . . . , second stage intermediate sum calculating circuits 320 . . . , a final stage intermediate sum calculating circuit 400 in a multi-stage tree configuration. Each of the intermediate sum calculating circuits 310, 320, . . . 400 are formed employing the adders discussed with respect to FIG. 1. Each of the first stage intermediate sum calculating circuits 310 receives four partial AND's from the partial AND generating portion 200 and derives two intermediate sums for outputting. Similarly, the second stage intermediate sum calculating circuits 320 receives respective two outputs of two first stage intermediate sum calculating circuits 310 and thus four outputs of the first stage intermediate sum calculating circuits to outputs two outputs.

The number of the intermediate sum calculating circuits at respective stages is determined corresponding to the number of bits of the multiplying value. Also, the number of stages of the intermediate sum calculating circuits to be employed in the intermediate sum generating portion is determined from $(\log n - \log 2)/(\log 2)$. For instance, if the multiplying value is 16 bits, the number of stages of the intermediate sum calculating circuits becomes three. In this case, the number of the intermediate sum calculating circuits 310 in the first stage becomes 4, the number of the intermediate sum calculating circuit 320 in the second stage becomes 2, and the number of the intermediate sum calculating circuit 400 at the final stage becomes 1.

The construction of the intermediate sum calculating circuit 310, 320, . . . 400 employing the adder 150 of four inputs and two outputs as illustrated in FIG. 1, will be discussed with reference to FIG. 3. As shown, the intermediate sum calculating circuit is constructed with n or more in number of adders 150 when the multiplied value is n bits. The intermediate carry cout of each adder 150 is connected to carry input cin of the adder 150 of the next digit for establishing parallel connection. To the carry input cin of the adder 150 at the lowermost digit, "0" is input. On the other hand, the intermediate carry of the adder 150 at the uppermost digit is used as SUM.

The number of the adders 150 employed in each intermediate sum calculating circuit is $n+3$ in the first stage adder series, increased toward the upper stage and finally becomes 2n at the final stage, when the multiplied value is n-bit, for example.

In the intermediate sum calculating circuit shown in FIG. 3, consideration is given for the case, as an example, in which four 5-bit inputs "$X_5, X_4, X_3, X_2, X_1$", "$Y_5, Y_4, Y_3, Y_2, Y_1$", "$Z_5, Z_4, Z_3, Z_2, Z_1$" and "$W_5, W_4, W_3, W_2, W_1$" are input. It should be noted that all of the alphabetic characters represent "0" or "1". In this case, since the input values are 5-bit, five adders 150 are connected in parallel. Then, each adder 150 performs addition process with respect to corresponding digit.

$$\begin{array}{r} X_5\ X_4\ X_3\ X_2\ X_1 \\ Y_5\ Y_4\ Y_3\ Y_2\ Y_1 \\ Z_5\ Z_4\ Z_3\ Z_2\ Z_1 \\ +\ W_5\ W_4\ W_3\ W_2\ W_1 \\ \hline S_6\ S_5\ S_4\ S_3\ S_2\ S_1 \quad \text{(SUM)} \\ C_5\ C_4\ C_3\ C_2\ c_1 \quad \text{(CARRY)} \end{array}$$

Here, for $S_6$, the intermediate carry cout ($D_5$) of the adder 150 of the uppermost digit is used. In the above-mentioned arithmetic operation, C (CARRY) and S (SUM) satisfying the equation $X+Y+Z+W=2C+S$.

In the foregoing arithmetic operation, when the lowermost digit is observed:

$$\begin{array}{ll} \text{"0"} & \text{(cin)} \\ X_1 & \\ Y_1 & \\ Z_1 & \\ +\ W_1 & \\ \hline S_1 & \text{(SUM)} \quad \text{weight 1} \\ C_1 & \text{(CARRY)} \quad \text{weight 2} \\ D_1 & \text{(cout)} \quad \text{weight 2} \end{array}$$

Here, $X_1+Y_1+Z_1+W_1+2D_1+2C_1+S_1$ is satisfied.

The addition is also performed in the next digit through:

$$\begin{array}{ll} D_1 & \text{(cin) cout of the preceding digit} \\ X_2 & \\ Y_2 & \\ Z_2 & \\ +\ W_2 & \\ \hline S_2 & \text{(SUM)} \quad \text{weight 1} \\ C_2 & \text{(CARRY)} \quad \text{weight 2} \\ D_2 & \text{(cout)} \quad \text{weight 2} \end{array}$$

Here, $X_2+Y_2+Z_2+W_2+D_2=2D_2C_2+S_2$ is satisfied.

In the uppermost digit, the calculation is performed as:

$$\begin{array}{ll} D_4 & \text{(cin) cout of the preceding digit} \\ X_5 & \\ Y_5 & \\ Z_5 & \\ +\ W_5 & \\ \hline S_6\ S_5 & \text{(SUM)} \quad \text{weight 1} \\ C_6 & \text{(CARRY)} \quad \text{weight 2} \\ D_6 & \text{(cout)} \quad \text{weight 2} \end{array}$$

Then, $S_6$ becomes equal to $D_6$.

It should be appreciated that, in the foregoing calculation, it should appear to take a long arithmetic operation period since it implies D (cout) is calculated from (X, Y, Z, W) at the lowermost digit and D is further calculated from (X, Y, Z, W, D) in subsequent digits. However, as can be clear from the circuit of FIG. 1, D (cout) is calculated only from (X, Y, Z, W) and will not be influenced by D (cout) of the preceding digit. Therefore, even at a large number of digits, it does not take a long period.

Here, example will be given for the case where four 3-bit data (111, 101, 110, 001) are processed for adding by the above-mentioned intermediate sum calculating circuit. As can be appreciated, the shown example is an addition of 7+5+6+11 in binary values.

```
    0 1 0   (cin)
    1 1 1
    1 0 1
  + 0 0 1
  -------
    1 1 1 1 (SUM)
    0 1 0   (CARRY)
    1 0 1   (cout)
```

As a result of this, since (SUM)=1111=(15) and c(CARRY)=100 =(4), the total becomes 19 (=7+5+6+1).

In the partial AND generating portion 200, by multiplying n-bit multiplied value X with each bit (Y1, Y2, Y3, ... Yn) of the multiplying value Y, n in number of n-bit partial AND's A(1) to A(n), i.e. X×Y1, X×Y2, X×Y3, ... X×Yn, are derived. Accordingly, n in number of the partial AND's A(1) to A(n) are output from each of the partial AND generating portions 200. The number of the partial AND's to be generated by the partial AND generating portion 200 depends on the number of bits of the multiplying value Y. Also, the number of bits of the partial AND's depends on the number of bits of the multiplied value X. Accordingly, assuming the multiplied value X is 8-bit and multiplying value Y is 16-bit, 16 8-bits partial AND's are output from the partial AND generating portion 200.

For each of a plurality of first stage intermediate sum calculating circuits 310 . . . , four in number of partial AND's are input. Each first stage intermediate sum calculating circuit 310 . . . then performs addition for the four partial AND's input thereto and outputs two intermediate sums. By this, the number of the intermediate sums output from the first stage intermediate sum calculating circuits 310 . . . becomes half (½ n) of the number of the partial AND's from the partial AND generating portion 200.

Respective four intermediate sums output from the first stage intermediate sum calculating circuits 310 . . . are input to corresponding second stage intermediate sum calculating circuits 320 . . . In each of the second stage intermediate sum calculating circuits 320 . . . , four intermediate sums from the first stage intermediate sum calculating circuits 310 . . . are added to be output as two second stage intermediate sums. Therefore, through the second stage intermediate sum calculating portions 320 . . . , the number of the intermediate sums output therefrom becomes a quarter (¼ n) of the number of the partial AND's input from the partial AND generating portion 200.

At a final stage of the intermediate sum calculating circuit 400, which is (log n−log 2)/(log 2) th stage of the intermediate sum calculating circuit, two intermediate sums are output. Two intermediate sums output from the final stage intermediate sum calculating circuit 400 are added by the carry propagation type adder 500 and output as a product B of the multiplied value X and the multiplying value Y.

As set forth above, since the preferred embodiment of the multiplying circuit according to the present invention employs adders of four input and two outputs, the number of stages of the intermediate sum calculating circuits becomes (log n−log 2)/(log 2) which is much smaller than (log n−log 2)/(log 1.5) which is required when the conventional intermediate sum calculating circuits employing full adders of three input and two output.

A necessary period to reduce the number of the intermediate sums into two employing the adders of four inputs and two outputs, is expressed as follow with assuming that the delay period of the adder is $\tau 4$.

$$\tau 4 \times (\log n - \log 2)/(\log 2)$$

On the other hand, the necessary period to reduce the number of the intermediate sums into two in the conventional Wallace type multiplier circuit is expressed as follows with assuming that the delay period of the full adder is $\tau 3$.

$$\tau 3 \times (\log n - \log 2)/(\log 1.5)$$

Here, when the delay period $\tau 4$ of the adder employed in the preferred embodiment satisfies the equation $$\tau 4 < \tau 3 \times \log 2 \div \log 1.5 \approx \tau 3 \times 1.7$$

the multiplier circuit can be speeded up. The adder employed in the preferred embodiment satisfies the foregoing condition. Therefore, the preferred embodiment of the multiplier circuit according to the present invention can provide higher speed than the conventional Wallace type multiplier circuit employing the full adders of three inputs and two outputs.

As set forth above, since the present invention can speed up the period required for reducing the number of intermediate sums, which is the substantial part of operation period of the multiplier circuit, it becomes possible to significantly speed up the operation speed of the multiplier circuit.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An adder comprising:
   first logic circuit receiving first to fourth inputs and outputting a first logical value as a NAND of the first and second inputs and a second logical value as a NAND of the third and fourth inputs and a first output value as a NAND of the first and second logical values;
   second logic circuit outputting a third logical value as a NAND of said first logical value and a value of an OR of said first and second inputs;

third logic circuit outputting a fourth logical value as a NAND of said second logical value and a value of an OR of said third and fourth inputs;

fourth logic circuit outputting a fifth logical value as an exclusive OR of the third and fourth logical values;

fifth logic circuit outputting an exclusive OR of said fifth logical value and a fifth input as a second output value; and sixth logic circuit performing a NOR operation for a NOR of said first and second logical values, a NOR of said third and fourth logical values and an AND of said fifth input and said fifth logical value to output a third output value.

2. An adder as set forth in claim 1, wherein said first logic circuit comprises
 a first NAND gate inputting said first and second inputs and outputting a first NAND output;
 a second NAND gate inputting said third and fourth inputs and outputting a second NAND output; and
 a third NAND gate inputting said first and second NAND outputs and outputting an intermediate carry as said first output;

said second logic circuit comprises
 a first OR gate inputting said first and second inputs and outputting a first OR output; and
 a fourth NAND gate inputting said first NAND output and said first OR output and outputting a fourth NAND output;

said third logic circuit comprises:
 a second OR gate inputting said third and fourth inputs and outputting a second OR output; and
 a fifth NAND gate inputting said second NAND output and said second OR output and outputting a fifth NAND output;

said fourth logic circuit comprises:
 a first exclusive OR gate inputting said fourth and fifth NAND outputs and outputting a first exclusive OR output;

said fifth logic circuit comprises:
 a second exclusive OR gate inputting said fifth input and said first exclusive OR output and outputting a second exclusive OR output as a sum of said first to fourth inputs;

said sixth logic circuit comprises:
 first NOR gate inputting said first and second NAND outputs and outputting a first NOR output;
 a second NOR gate inputting said fourth and fifth NAND outputs and outputting a second NOR output;
 an AND gate inputting said fifth input and said first exclusive OR output and outputting an AND output;
 a third NOR gate inputting said first and second NOR outputs and said AND outputs and outputting a third NOR output; and
 an inverter outputting a carry as said third output by inverting said third NOR output.

3. A multiplier circuit comprising:
partial AND generating means for generating n partial AND's as products of a multiplied value and respective bits of n-bit multiplying value;
intermediate sum generating means for inputting n partial AND's, generating intermediate sums and reducing a number of said intermediate sums progressively for finally outputting two intermediate sums;
adder means for adding two intermediate sums output from said intermediate sum generating means for outputting a product of multiplication of said multiplied value and said multiplying value;
said intermediate sum generating means comprising a plurality of intermediate sum calculating circuits, each of which comprises a plurality of adders having four inputs and two outputs, connected in parallel, said intermediate sum calculating circuits are connected in a plurality of stages in a tree-like configuration; and
each of said plurality of adders comprising
 first logic circuit receiving first to fourth inputs and outputting a first logical value as a NAND of the first and second inputs and a second logical value as a NAND of the third and fourth inputs and a first output value as a NAND of the first and second logical values;
 second logic circuit outputting a third logical value as a NAND of said first logical value and a value of an OR of said first and second inputs;
 third logic circuit outputting a fourth logical value as a NAND of said second logical value and a value of an OR of said third and fourth inputs;
 fourth logic circuit outputting a fifth logical value as an exclusive OR of the third and fourth logical values;
 fifth logic circuit outputting an exclusive OR of said fifth logical value and a fifth input as a second output value; and
 sixth logic circuit performing a NOR operation for a NOR of said first and second logical values, a NOR of said third and fourth logical values and an AND of said fifth input and said fifth logical value to output a third output value.

4. A multiplier circuit as set forth in claim 3, wherein said intermediate sum calculating circuit is constructed by establishing parallel connection of a plurality of adders by connecting first output of said adder to said fifth input of the adder at the next digit.

5. A multiplier circuit as set forth in claim 4, wherein said intermediate sum calculating circuit inputs "0" to said fifth input of an adder at the lowermost digit and takes the first output as said second output in the adder at the uppermost digit.

6. A multiplier circuit as set forth in claim 3, wherein said intermediate sum generating means includes said intermediate sum calculating circuits of (log n−log 2)/(log 2) stages.

7. A multiplier circuit as set forth in claim 3, wherein said first logic circuit comprises
 a first NAND gate inputting said first and second inputs and outputting a first NAND output;
 a second NAND gate inputting said third and fourth inputs and outputting a second NAND output; and
 a third NAND gate inputting said first and second NAND outputs and outputting an intermediate carry as said first output;

said second logic circuit comprises
 a first OR gate inputting said first and second inputs and outputting a first OR output; and
 a fourth NAND gate inputting said first NAND output and said first OR output and outputting a fourth NAND output;

said third logic circuit comprises:

a second OR gate inputting said third and fourth inputs and outputting a second OR output; and a fifth NAND gate inputting said second NAND output and said second OR output and outputting a fifth NAND output;

said fourth logic circuit comprises:

a first exclusive OR gate inputting said fourth and fifth NAND outputs and outputting a first exclusive OR output;

said fifth logic circuit comprises:

a second exclusive OR gate inputting said fifth input and said first exclusive OR output and outputting a second exclusive OR output as a sum of said first to fourth inputs;

said sixth logic circuit comprises:

first NOR gate inputting said first and second NAND outputs and outputting a first NOR output;

a second NOR gate inputting said fourth and fifth NAND outputs and outputting a second NOR output;

an AND gate inputting said fifth input and said first exclusive OR output and outputting an AND output;

a third NOR gate inputting said first and second NOR outputs and said AND outputs and outputting a third NOR output; and an inverter outputting a carry as said third output by inverting said third NOR output.

* * * * *